United States Patent
Bostic

[19]

[11] Patent Number: 6,060,696
[45] Date of Patent: *May 9, 2000

[54] FOOD DELIVERY CONTAINER

[75] Inventor: William M. Bostic, Asheboro, N.C.

[73] Assignee: Vesture Corporation, Asheboro, N.C.

[ * ] Notice: This patent is subject to a terminal disclaimer.

[21] Appl. No.: 09/200,572

[22] Filed: Nov. 27, 1998

Related U.S. Application Data

[63] Continuation of application No. 08/740,197, Oct. 24, 1996, Pat. No. 5,880,435.

[51] Int. Cl.$^7$ .............................. A21B 1/52; H05B 3/24; H05B 3/28
[52] U.S. Cl. ........................ 219/387; 219/530; 219/540
[58] Field of Search ................................... 219/385–387, 219/457, 462, 521, 528–530, 540, 544, 549; 165/104.11, 104.17, 104.21, 10; 126/400; 428/402; 252/70

[56] References Cited

U.S. PATENT DOCUMENTS

| | | | |
|---|---|---|---|
| 4,182,405 | 1/1980 | Hysen et al. | 165/48.1 |
| 4,198,559 | 4/1980 | Walter et al. | 219/387 |
| 4,504,402 | 3/1985 | Chen et al. | 252/70 |
| 4,672,178 | 6/1987 | Wada et al. | 126/400 |
| 4,777,930 | 10/1988 | Hartz | 126/400 |
| 4,806,736 | 2/1989 | Schirico | 219/386 |
| 4,983,798 | 1/1991 | Eckler et al. | 219/462 |
| 5,052,369 | 10/1991 | Johnson | 126/400 |
| 5,070,223 | 12/1991 | Colasante | 219/759 |
| 5,125,391 | 6/1992 | Srivastava et al. | 126/400 |
| 5,159,177 | 10/1992 | Kinberger | 219/386 |
| 5,329,096 | 7/1994 | Suematsu | 219/528 |
| 5,454,471 | 10/1995 | Norvell | 126/400 |
| 5,650,090 | 7/1997 | Salyer | 252/70 |
| 5,880,435 | 3/1999 | Bostic | 219/387 |

FOREIGN PATENT DOCUMENTS

96/26694   9/1996   WIPO.

*Primary Examiner*—Joseph Pelham

[57] ABSTRACT

A food delivery container is provided for pizza or other food items and includes a heating element having a phase change material such as a ultra-high molecular weight polyethylene which transforms from a solid to a semi-solid at approximately 248° –275° F. The heating element comprises a rigid envelope which is permeable to prevent gaseous buildup during heating. The heating element, when placed within a suitable insulated container, will maintain food warm for several hours during storage or delivery. In one embodiment of the heating element, an electric resistance grid is provided for supplying heat energy.

6 Claims, 3 Drawing Sheets

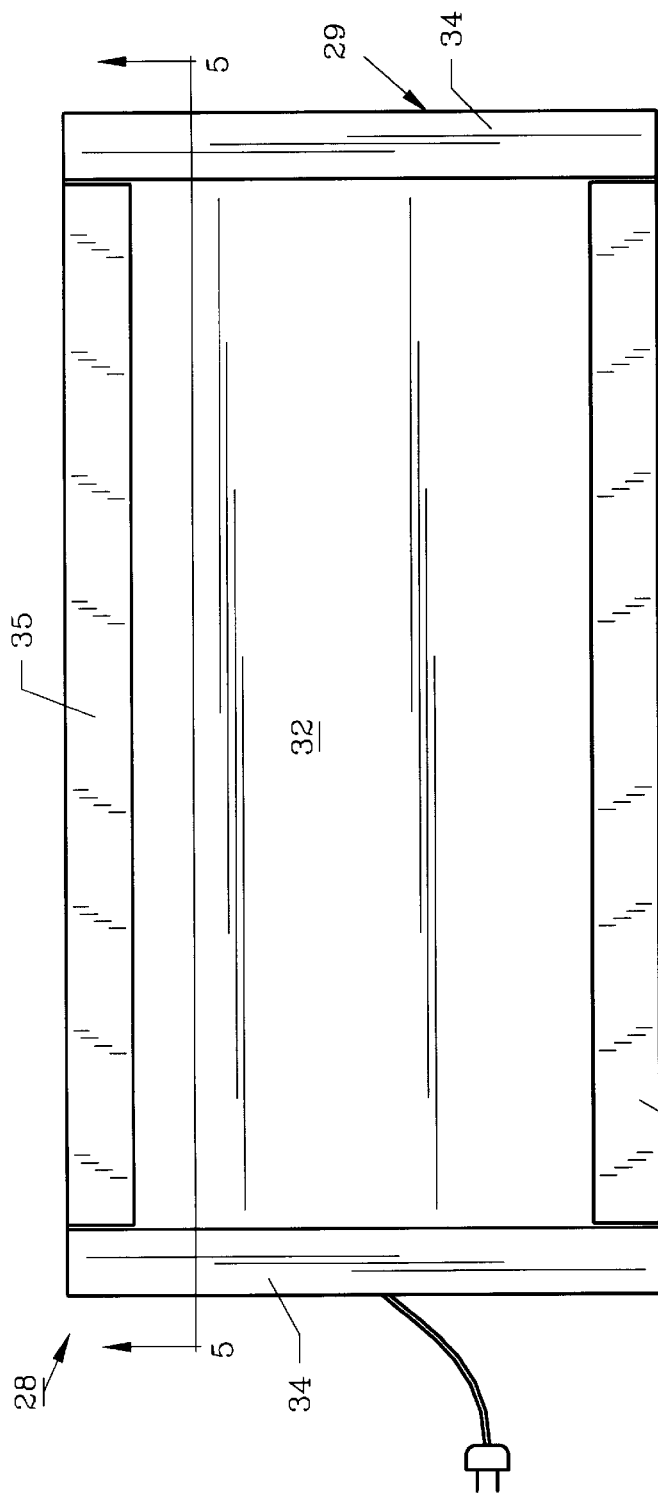
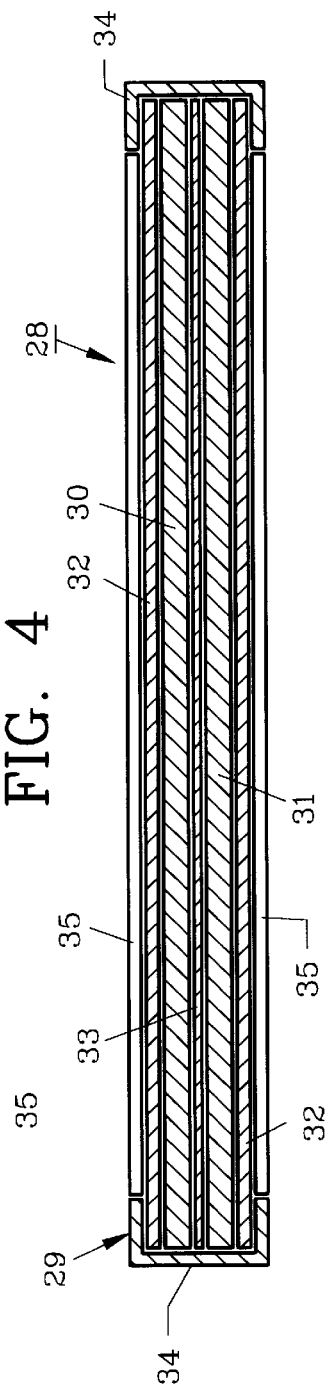
FIG. 4
FIG. 5

6,060,696

FOOD DELIVERY CONTAINER

This is a continuation of application Ser. No. 08/740,197, filed Oct. 24, 1996, now U.S. Pat. No. 5,880,435.

BACKGROUND OF THE INVENTION

1. Field of the Invention

The invention herein pertains to containers for delivery of prepared food and particularly of foods which are desirably warmed and maintained at adequate temperatures during delivery.

2. Description of the Prior Art and Objectives of the Invention

In recent years it has become increasingly popular to deliver prepared foods such as vegetable plates, sandwiches, French fries, pizzas and the like. Companies which provide home food delivery services are constantly seeking ways to improve the service, food quality and taste due to the competitive nature of the business. Insulated food and pizza delivery bags have been used for many years whereby warmed foods will retain a certain temperature level during delivery, depending on the transportation time and delivery route length.

One prior food delivery device is seen in U.S. Pat. No. 4,182,405 which provides a food temperature maintenance device for use in hospitals, hotels and otherwise. U.S. Pat. No. 4,806,736 demonstrates a portable pizza delivery bag which includes a heating unit having an electrical heating strip. U.S. Pat. No. 4,983,798 teaches a food-warming device such as for warming coffee. U.S. Pat. No. 5,052,369 includes a food heat storage system which uses a microcrystalline phase change wax as may be heated by a microwave oven for heat retention of food. While all the devices listed in the prior patents are advantageous under certain circumstances, the need for a simple, inexpensive delivery bag and a safe, efficient element has remained. Thus, it is one objective of the present invention to provide a food delivery container and removable heating element which will allow food to be kept in a warmed condition for several hours.

It is another objection of the present invention to provide a method for heating food using a heating element which can be warmed in a standard convection oven in one embodiment, and in another embodiment, includes an integral electric grid for heating purposes It is a further objective of the present invention to provide a method of forming a heating element in which a phase change material is enwrapped in a permeable metal or polymeric envelope.

It is still another objective of the present invention to provide a heating element in which a polymeric ultra-high molecular weight polyethylene is utilized.

It is still a further objective of the present invention to provide a food delivery container in which the phase change material consists solely of a homogeneous ultra-high molecular weight polyethylene.

Various other objectives and advantages of the present invention will become apparent to those skilled in the art as a more detailed description is set forth below.

SUMMARY OF THE INVENTION

The aforesaid and other objectives are realized by providing a rigid, durable, planar heating element in which a solid rectangular ultra-high molecular weight polyethylene is used as a phase change material encased within a permeable rigid envelope. Ultra-high molecular weight polyethylene as used herein refers to molecular weights from about twenty thousand (20,000) to one million (1,000,000). The metal envelope is permeable (not gas tight) in that the ends are not tightly sealed so that any resultant gases formed during heating may be allowed to escape. The selected ultra-high molecular weight polyethylene (>20,000 mw) begins changing phase from a solid to a semisolid or softens at approximately 248° F. when heated such as by placing one embodiment for a few minutes in a standard pizza oven by direct contact on an electrical resistance heater or hot plate. The heating element is then removed and placed in a food container such as a pizza bag or other suitable food container. Pizzas or other food can then be placed therein whereby such food will remain at approximately 160° F. for about two hours under normal (70° F.) ambient temperature. As the ultrahigh molecular weight polyethylene reverts to its solid form upon heat dissipation, the heating element can then be removed and reheated further as necessary for the next delivery cycle. Another embodiment of the heating element has an electric heating grid within.

BRIEF DESCRIPTION OF THE DRAWINGS

FIG. 4 shows another embodiment of the heating element with an integral electric resistance grid; and FIG. 5 features the embodiment of FIG. 4 in cross-section.

DETAILED DESCRIPTION OF THE PREFERRED EMBODIMENT OF THE INVENTION

Figures 1, 2:
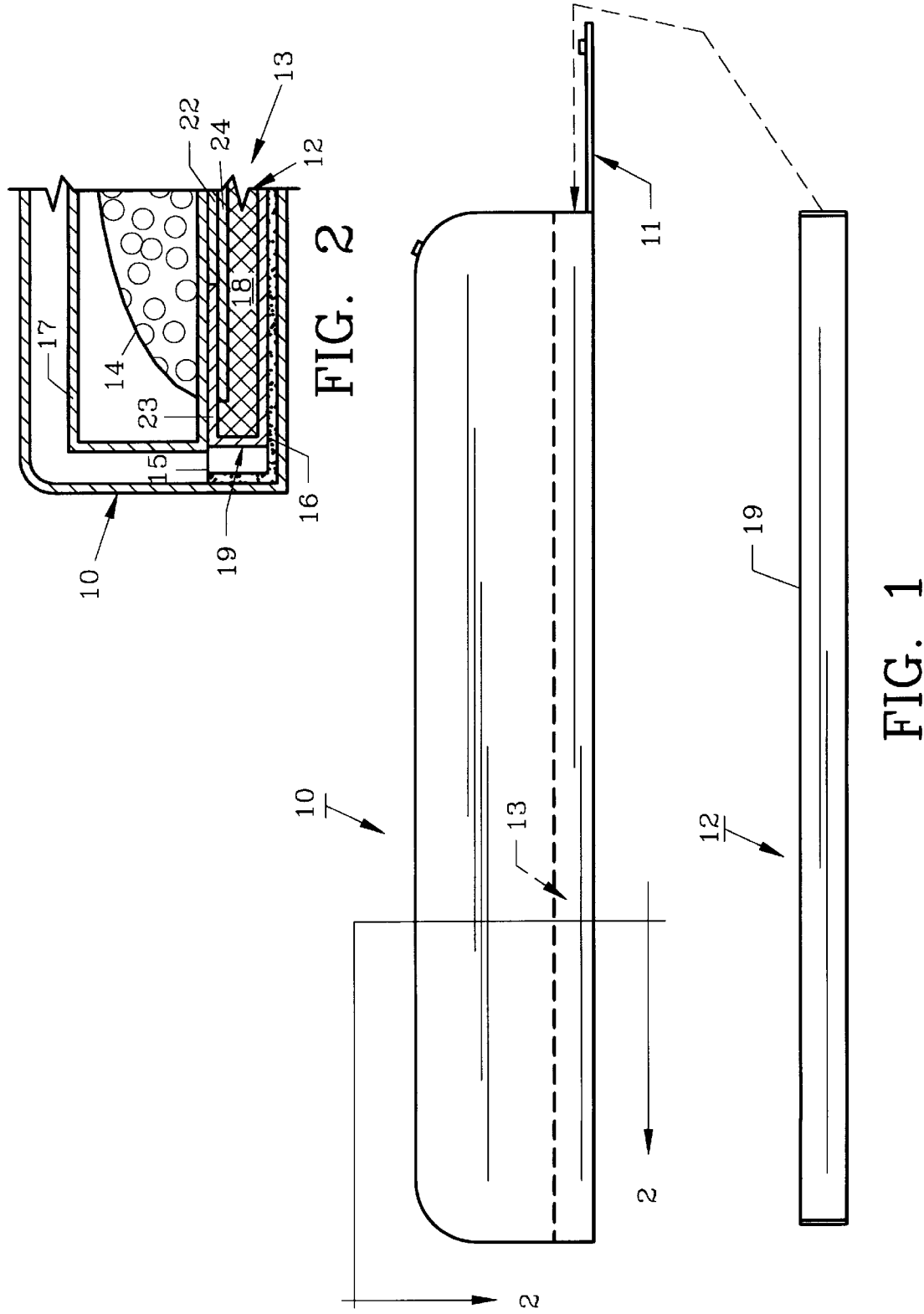
FIG. 1 illustrates a side elevational view of the preferred food delivery container of the invention with the heating element removed.
FIG. 2 demonstrates a fragmented cross-sectional view of the food delivery container as shown in FIG. 1 but with the heating element and a pizza box contained therein.

For a better understanding of the invention and its operation, turning now to the drawings, FIG. 1 illustrates pizza bag 10 having a closable end flap 11 with heating element 12 removed therefrom. Heating element 12 can be slid into compartment 13 contained along the bottom of pizza bag 10. As would be understood, pizza bag 10 is formed from an insulated fabric and is useful in pizza delivery or delivery of other foods such as French fried potatoes. Pizza bag 10 may have other shapes and sizes, depending on the particular food to be delivered and, of course, other delivery containers may be used as known in the industry such as insulated boxes.

FIG. 2 provides an enlarged cross-sectional view substantially along lines 2—2 of FIG. 1 to illustrate heating element 12 in place within pizza bag 10. As seen, cardboard box 17 contains pizza 14 within pizza bag 10. Heating element 12 is enclosed between top layer 15 of compartment 13 and bottom insulation layer 16 of pizza bag 10.

Figure 3:
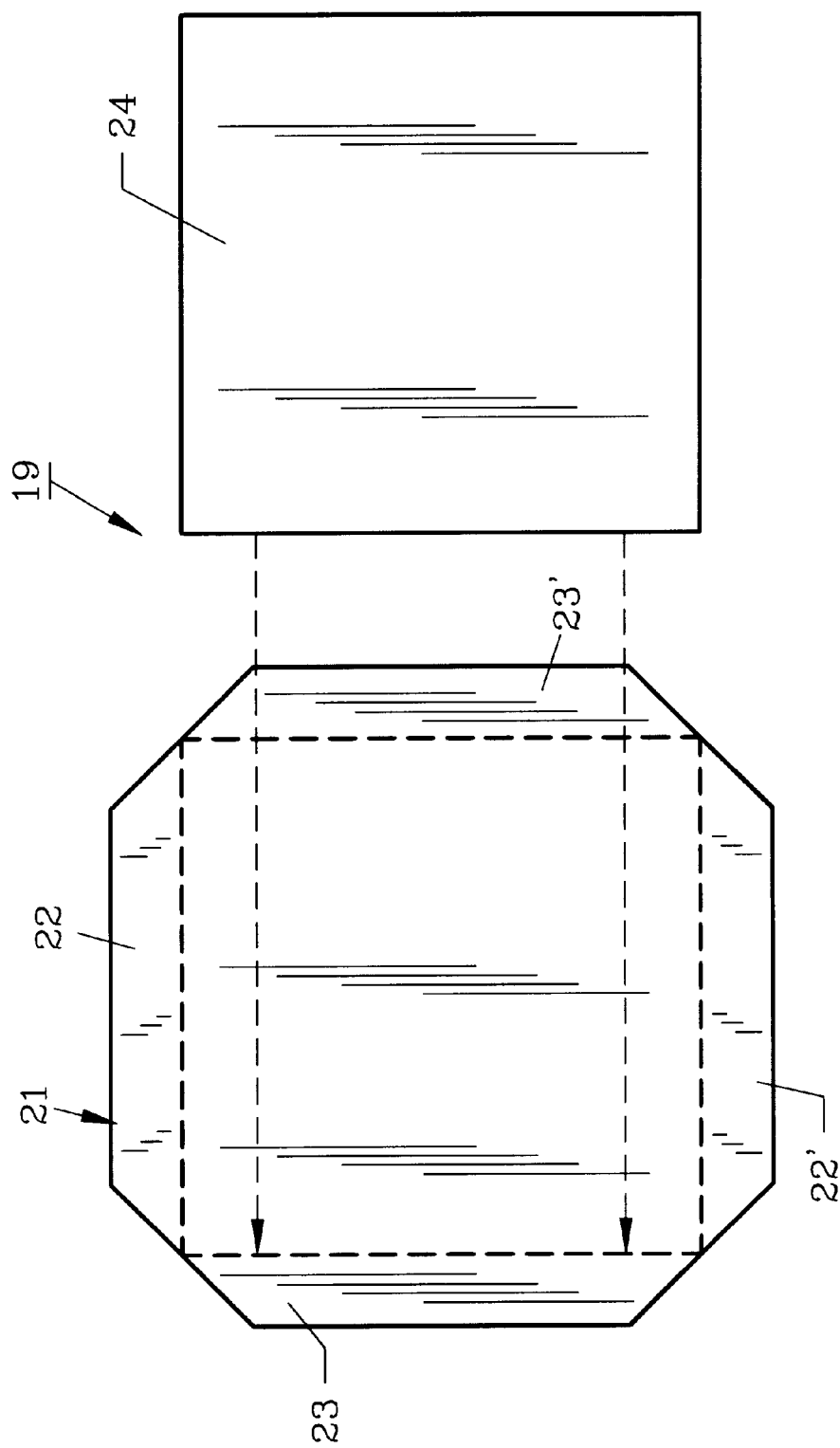
FIG. 3 depicts the heating element envelope as seen in FIG. 2 prior to assembly.

The preferred form of heating element 12 is also shown in FIG. 2 in which a sheet of ultra high molecular weight polyethylene 18: mw >20,000 melting point 120°–135° C.; density 0.941–0.965 g/cc; formula: —$(CH_2-CH_2)_x$—as manufactured by Poly-Hi Menasha Corporation of Indiana, sold under the trademark "SANALITE", is encased within rigid planar aluminum envelope 19. Aluminum envelope 19 is formed from thin sheets of aluminum stock having a preferred thickness of about 1.5 mm. Ultra-high molecular weight polyethylene 18 is planar and cut to the desired rectangular size and may has a thickness of 6.5 mm. As would be understood, envelope 19 is gas permeable at the corners (see FIG. 1) to allow escape of any gaseous build-up during heating. Preferred envelope 19 as shown in FIG. 3, is formed of two pieces, bottom 21 with foldable flaps 22, 22', 23, 23' and top 24. Ultra-high molecular weight polyethylene 18 is contained therein by simple folding of flaps 22, 22', 23, 23' over top 24 with polyethylene 18 therebetween (not seen in FIG. 3) and no seals or adhesives are required to maintain the integrity of envelope 19.

Ultra-high molecular weight polyethylene 18 as shown in FIG. 2, is but one of several homogeneous polymeric phase change materials that may be utilized. Ultra-high molecular weight polyethylene 18 was chosen as the preferred embodiment since its phase change occurs between 248° and 275° F., which can quickly be reached in about 5–10 minutes in a conventional pizza oven, and upon phase change remains semi-solid and does not become a highly-flowable liquid at the operating temperatures. Also, the costs for this molecular weight polyethylene is relatively low compared to higher molecular weight polyethylenes. Heating element 12 can be placed in a standard convection oven, such as a pizza oven, as usually operated at about 350° F., and upon reaching phase change temperature (248°–275° F.) can be placed in pizza bag 10 where it remains at above 160° F. for over two hours, thus assuring adequate heat energy available for maintaining and warming pizzas or other foods during delivery. Other ultra-high molecular weight polyethylenes can be used having molecular weights from about 20,000–1,000,000 depending upon the exact heat requirements needed. The lower molecular weight polyethylenes (mw 20,000) materials flow more easily, at lower temperatures than their higher molecular weight counterparts. Also, the higher the density of the polyethylene, the higher the crystalline content, hence greater energy storage is available.

In an alternate embodiment of the invention as seen in FIGS. 4 and 5, heating element 28 includes gas permeable rigid envelope 29 with ultra-high molecular weight polyethylene sheets 30, 31 placed between thin rigid polyester sheets 32, seen in cross-sectional representation in FIG. 5. Sandwiched between ultra-high molecular weight polyethylene sheets 30, 31 is a conventional 110v. AC electric resistance grid 33 for supplying energy thereto. The exact wattage of grid 33 can be varied to accommodate the particular phase change material employed and the heating time desired. C-shaped edging 34, 35 is also formed from polyester and mechanically maintains the integrity of rigid, gas permeable envelope 29 which, as shown, consists of edging 34, 35 and thin top and bottom sheets 32, all formed of polyester. The overall shape of heating element 28 is rectangular as seen in FIG. 4, sized to fit a standard food delivery container bag or box as hereinbefore described. Polyester sheets 32 can be used in place of aluminum sheets, such polyester sheets having a melting temperature of approximately 400° F. or higher. When using electric resistance grid 33, the distinctive properties of the polyester material will eliminate the need for three-wire equipment grounding, associated with exposed metal components. Element 28 may have electric grid 33 molded therein, depending on the particular assembly method utilized.

Various changes and modifications can be made to the examples presented and examples shown are merely for explanatory purposes and are not intended to limit the scope of the appended claims.

I claim:

1. A method of heating food comprising the steps of:
    a) forming a heating element by enclosing a lightweight homogeneous polyethylene phase change material in a rigid permeable envelope;
    b) subjecting the heating element to heat energy to change the phase of the material therein, said phase change occurring between 248° and 275° F., and
    c) placing the heating element proximate the food to be heated.

2. The method of heating food as described in claim 1 wherein subjecting the heating element to heat energy comprises placing the heating element in a convection oven.

3. The method of heating food as described in claim 1 wherein placing the heating element proximate the food comprises placing the heating element in a bag with the food contained therein.

4. A method of forming heating element comprising the steps of:
    a) forming an envelope from rigid aluminum sheets 1.5 mm thick, and
    b) enclosing a solid lightweight polyethylene phase change material within said envelope, said phase change occurring between 248° and 275° F.

5. The method of claim 4 wherein forming an envelope comprises forming a permeable envelope.

6. The method of claim 4 wherein enclosing a polyethylene phase change material comprises enclosing an ultra-high molecular weight polyethylene material.

* * * * *